US005339251A

United States Patent [19]

Asghar et al.

[11] Patent Number: 5,339,251
[45] Date of Patent: Aug. 16, 1994

[54] APPARATUS FOR ADAPTIVELY TUNING TO A RECEIVED PERIODIC SIGNAL

[75] Inventors: Safdar M. Asghar; Yan Zhou, both of Austin, Tex.

[73] Assignee: Advanced Micro Devices, Inc., Sunnyvale, Calif.

[21] Appl. No.: 796,318

[22] Filed: Nov. 22, 1991

[51] Int. Cl.$^5$ .............................................. G06F 15/31
[52] U.S. Cl. ................................................ 364/724.06
[58] Field of Search ................. 364/724.01, 724.06, 364/724.19; 331/179

[56] References Cited

U.S. PATENT DOCUMENTS

| 4,433,422 | 2/1984 | Kurth | 364/724.06 |
| 4,438,504 | 3/1984 | Favin | 364/724.06 |
| 4,791,390 | 12/1988 | Harris et al. | 364/724.19 |
| 4,839,842 | 6/1989 | Pyi et al. | 364/721 |
| 5,189,381 | 2/1993 | Asghar et al. | 331/179 |

Primary Examiner—Long T. Nguyen
Attorney, Agent, or Firm—Foley & Lardner

[57] ABSTRACT

An apparatus for adaptively tuning to a received periodic signal. The apparatus preferably employs digital signal processing techniques for algorithmic generation of a sinusoidal estimated output signal, determines the difference between the estimated output signal and the received signal, and generates an error signal based upon the difference between the estimated output signal and the received signal. The error signal is applied to vary at least one factor of the algorithmic determination of the estimated output signal appropriately to reduce the error between the estimated output signal and the received signal.

16 Claims, 2 Drawing Sheets

APPARATUS FOR ADAPTIVELY TUNING TO A RECEIVED PERIODIC SIGNAL

BACKGROUND OF THE INVENTION

The present invention is directed to an apparatus which will adaptively tune to a received periodic signal and, in one embodiment, will identify the frequency of the received signal to a user.

Adaptive tuning to a received periodic signal is useful in a variety of situations, such as tuning to a homing beacon or other similar navigational device, or, generally, tuning to or identifying any periodic signal of unknown frequency with speed and precision.

Prior art devices for identifying and tuning to an unidentified (i.e., the frequency is unknown) received signal involved filtering the received signal through an array of high Q filters, and establishing a frequency range within which the received frequency is propagated by noting which of the high Q filters in the array passes the received signal. In order to provide a high degree of accuracy in ascertaining the frequency of the received signal, such prior art circuits must necessarily have a large number of high Q filters in the filter array. A greater number of filters reduces the interval between detectable frequencies and, therefore, increased the accuracy by which the received frequency can be determined.

Thus, such prior art devices necessarily require that some estimation of the frequency of the received signal be known in advance in order that the frequency range detectable by the filter array can be assured to include the frequency expected to be received. In order to search a very wide frequency spectrum, it is sometimes required that a plurality of prior art devices be employed, with each device addressing a different range of frequencies.

The prior art devices thus described are slow to operate, require foreknowledge of the range within the anticipated frequency of the received signal will fall, and require the use of analog devices, such as high Q filters, which are known by those skilled in the art to be less stable than digital circuit elements, especially when subjected to variations of ambient temperature.

It is desirable that an apparatus be provided for detection of frequency of a received signal which is stable in operation in a variety of environments, which is capable of accurate determination of the frequency of the received signal, and which is capable of ascertaining the frequency of the received signal speedily.

SUMMARY OF THE INVENTION

The invention is an apparatus for adaptively tuning to a received periodic signal. The apparatus preferably employs digital signal processing techniques for algorithmic generation of a sinusoidal estimated output signal, determines the difference between the estimated output signal and the received signal, and generates an error signal based upon the difference between the estimated output signal and the received signal. The error signal is applied to vary at least one factor of the algorithmic determination of the estimated output signal appropriately to reduce the error between the estimated output signal and the received signal.

In one embodiment of the present invention, when the error signal is reduced to zero, the algorithmic factor which was varied to effect reduction of the error signal is logically treated to ascertain the frequency of the received signal and such information is conveyed to a user.

An alternate embodiment of the invention accommodates white Gaussian noise in tuning to a received signal.

It is therefore an object of the present invention to provide an apparatus for adaptively tuning to a received periodic signal which employs digital signaling processing and is stable in a variety of operating environments.

A further object of the present invention is to provide an apparatus for adaptively tuning to a received periodic signal which is inexpensive to construct and ascertains the frequency of a received signal with a high degree of accuracy.

Yet a further object of the present invention is to provide an apparatus for adaptively tuning to a received periodic signal which effects such adaptive tuning speedily.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

As disclosed in U.S. Pat. No. 4,839,842 to Pyi and Asghar, which patent is assigned to the assignee of the present invention, a periodic waveform may be represented by the expression:

$$\cos(m+1)\Delta = 2\cos(m)\Delta\cos\Delta - \cos(m-1)\Delta; \quad [1]$$

where $\Delta = 2\pi fT$
$f$ = signal frequency
$T$ = sampling interval

Given that the sampling interval T is equal to one over $f_s$ ($f_s$ equals sampling frequency), the value of $\Delta$ may be rewritten as:

$$\Delta = \frac{2\pi f}{f_s}$$

For simplicity of expression, Eqn. [1] can be rewritten as:

$$x_{n+1} = 2\cos\Delta \, x_n - x_{n-1}; \quad [2]$$

where $x_n = \cos(n)\Delta$

For any given signal frequency, f, the quantity $2\cos\Delta$ is a constant, K. Thus, Eqn. [2] can be expressed as:

$$x_{n+1} = Kx_n - x_{n-1}; \quad [3]$$

$$K = 2\cos\Delta \quad [4]$$

Figure 1:
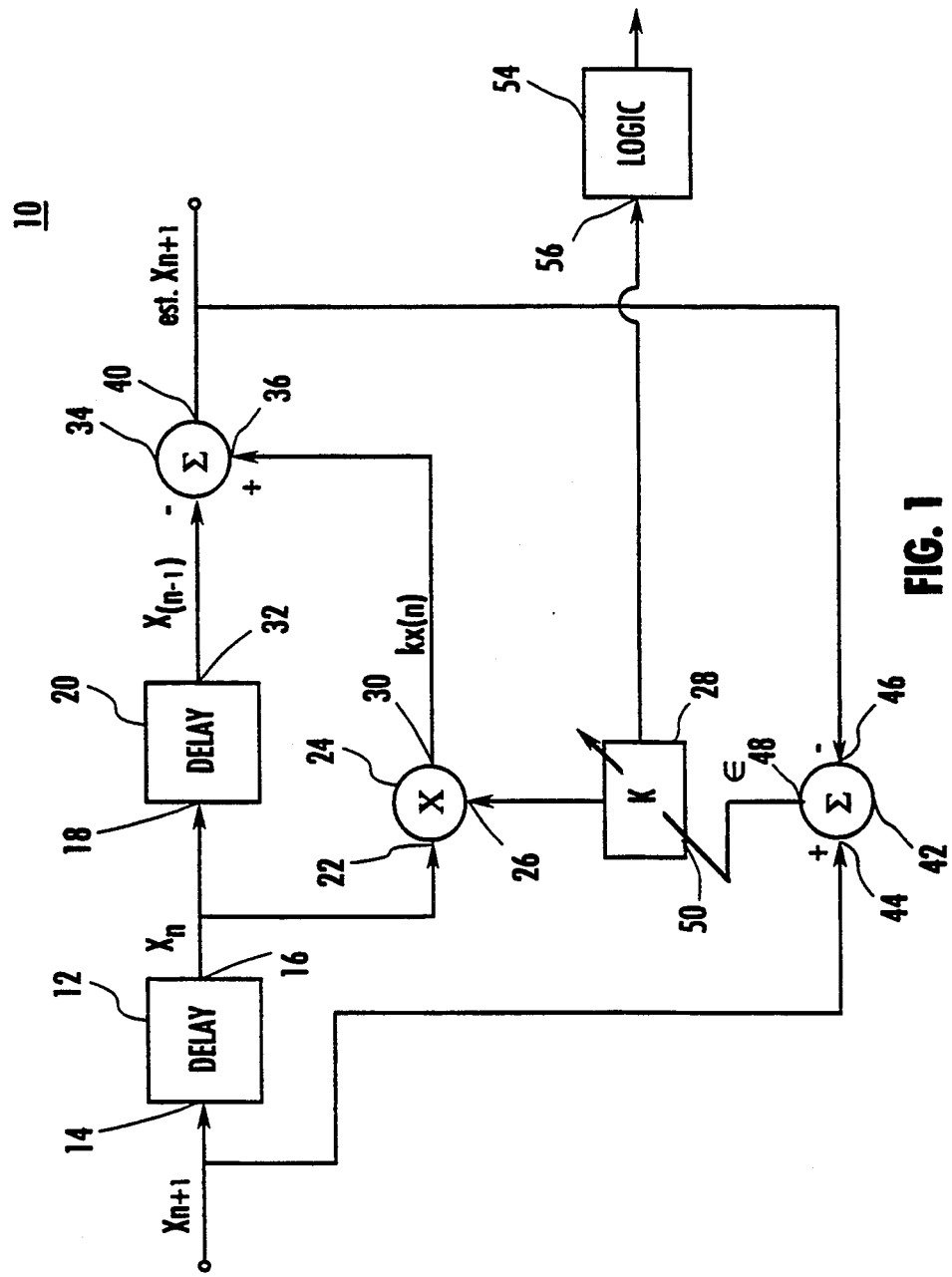
FIG. 1 is a schematic diagram of the preferred embodiment of the present invention.

The relationship expressed in Eqn. [3] may be advantageously employed in an apparatus for adaptively tuning to a received periodic signal as illustrated in FIG. 1. In FIG. 1, an adaptive tuning apparatus 10 is illustrated having a first delay circuit 12 receiving an incoming signal $x_{n+1}$ at an input 14. First delay circuit 12 delays incoming signal $x_{n+1}$ by one clock period and generates a once-delayed signal, $x_n$, at an output 16. Once-delayed signal, $x_n$, is provided to an input 18 of a second delay circuit 20 and to an input 22 of a multiplier circuit 24. Multiplier circuit 24 also receives a multiplier, K, at a multiplier input 26 from a multiplier source 28. Multiplier circuit 24 provides a multiplier output signal, $Kx_n$, at an output 30. Second delay circuit 20 delays once-delayed signal $x_n$ one clock period and generates a twice-delayed signal, $x_{n-1}$, at an output 32. A first summing circuit 34 receives multiplier output signal $Kx_n$ at an input 36, receives twice-delayed signal $x_{n-1}$ at a negative input terminal 38, and generates an output signal at an output 40. The output signal generated at output 40 is an estimated signal, est. $x_{n+1}$, which comprises the difference between multiplier output signal $Kx_n$, less twice-delayed signal $x_{n-1}$.

A second summing circuit 42 receives estimated signal est. $x_{n+a}$ at a negative input terminal 46, receives received signal $x_{n+1}$ at an input 44, and generates an output signal at an output 48. The output signal generated at output 48 is an error signal $\epsilon$ which comprises the difference between received signal $x_{n+1}$, less estimated signal est. $x_{n+1}$.

Error signal $\epsilon$ is applied to an input 50 of multiplier source 28. Multiplier source 28 responds to error signal $\epsilon$ to alter multiplier K provided to multiplier input 26 appropriately to reduce error signal $\epsilon$.

When error signal $\epsilon$ equals zero, estimated signal est. $x_{n+1}$ equals received signal $x_{n+1}$, and adaptive tuning apparatus 10 has successfully tuned to received signal $x_{n+1}$.

When error signal $\epsilon$ equals zero, it is possible to ascertain the frequency of received signal $x_{n+1}$ by recalling Eqn. [4] above, so that for the frequency at which error signal $\epsilon$ equals zero, $$K = 2 \cos \Theta \quad [5]$$

where $\Theta$ identifies the target frequency, $f_t$ (that is, the frequency of received signal $x_{n+1}$). Thus, since:

$$\theta = \frac{2\pi f_t}{f_s} \quad [6]$$

and since $f_s$, the sampling frequency, is known, then $f_t$ can be readily determined by the expression:

$$f_t = \frac{f_s \arccos\left(\frac{K}{2}\right)}{2\pi} \quad [7]$$

Adaptive tuning apparatus 10 also may include a logic module 54 which receives an input signal from multiplier source 28 at an input 56. The input received from multiplier source 28 at input 56 comprises the value of K generated by multiplier source 28 when error signal $\epsilon$ equals zero. In the embodiment of the present invention illustrated in FIG. 1, it is contemplated that logic module 54 will contain a stored arccosine table in appropriate detail to identify, with the accuracy desired, the arccosine of the quantity:

$$\frac{K}{2}$$

Further logic module 54 stores the value $f_s$ of the sampling frequency and the value $\pi$ to enable calculation of $f_t$, the target frequency, according to Eqn. [7] above.

Figure 2:
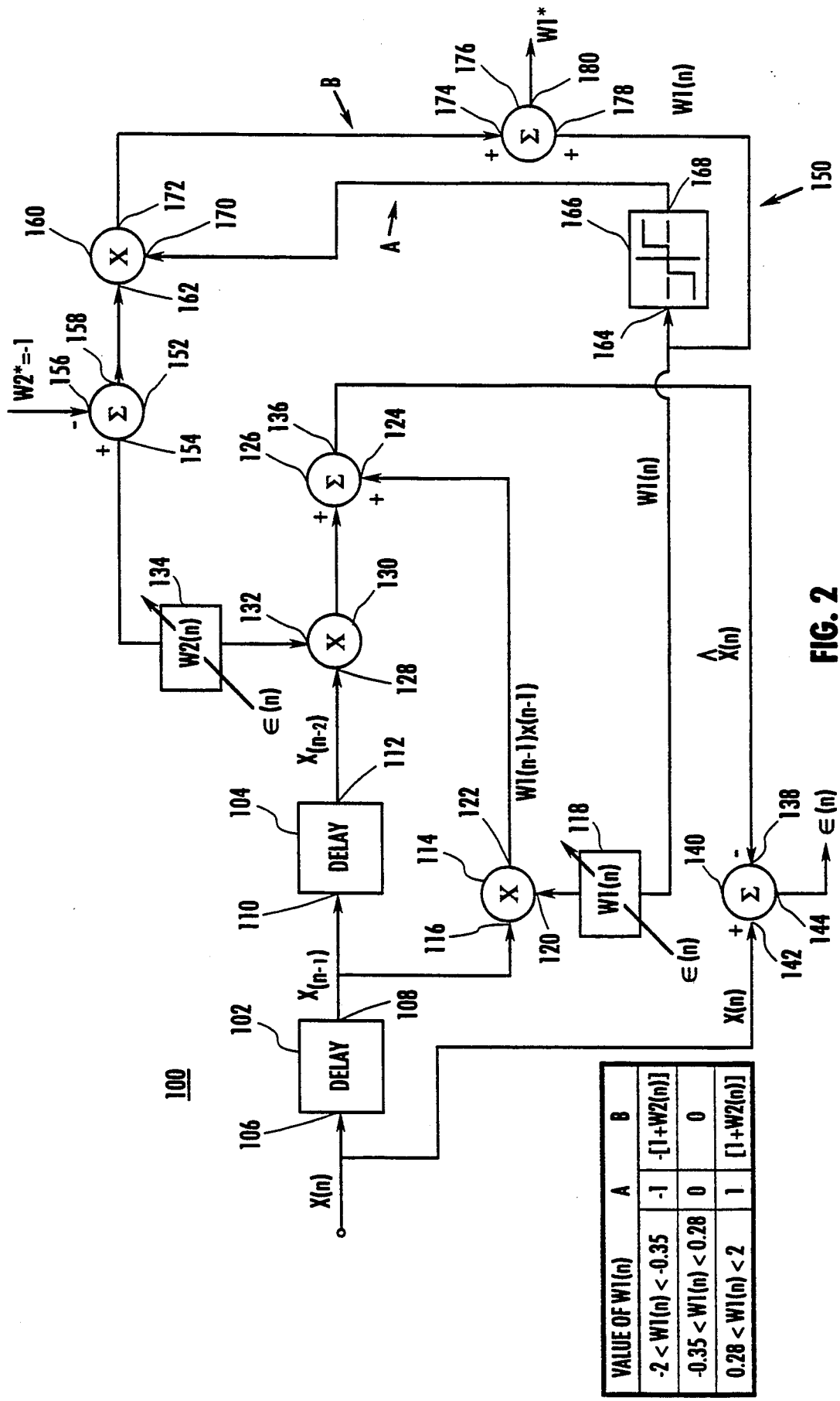
FIG. 2 is a schematic diagram of an alternate embodiment of the present invention configured to accommodate noise.

FIG. 2 is a schematic diagram of an alternate embodiment of the present invention configured to accommodate noise. Eqn. [3] discussed in connection with the preferred embodiment of the present invention illustrated in FIG. 1, may be rewritten to account for white Gaussian noise in the form:

$$x(n) = Wx(n-1) - x(n-2) \quad [8]$$

$$W = 2\cos\frac{2\pi f(n)}{f_s}$$

where f(n) equals a time varying frequency of the received sinusoidal signal and $f_s$ equals sampling frequency.

Referring to FIG. 2, an apparatus 100 is illustrated having a first delay circuit 102 and a second delay circuit 104. An input signal, x(n), is received by apparatus 100 at an input 106 to first delay circuit 102. First delay circuit 102 delays input signal x(n) one clock period and generates at an output 108 a once-delayed signal x(n−1); x(n−1) is substantially input signal x(n) delayed one clock period. Second delay circuit 104 receives once-delayed signal x(n−1) at an input 110 and delays once-delayed signal x(n−1) by one further clock period, generating at a twice-delayed signal x(n−2) at an output 112. Once-delayed signal x(n−1) is also applied to a multiplier 114 at an input 116.

A first weighted factor source 118 provides a first weighted factor, W1(n), to an input 120 of multiplier 114. Multiplier 114 generates at an output 122 a weighted once-delayed signal which is substantially the product of once-delayed signal x(n−1) and first weighted factor W1(n). This weighted once-delayed signal is applied to an input 124 of a summing node 126.

Twice-delayed signal x(n−2) is applied to an input 128 of a multiplier 130. Multiplier 130 also receives at an input 132 a second weighted factor, W2(n), from a second weighted factor source 134. Summing node 126 produces at an output 136 an estimation of input signal x(n), $\hat{x}(n)$, estimated input signal $\hat{x}(n)$ is applied to an input 138 of a summing node 140. Also received by summing node 140 at an input 142 is input signal x(n). Summing node 140 produces at an output 144 an error signal $\epsilon$. First weighted factor source 118 and second weighted factor source 134 are responsive to error signal $\epsilon$ to vary first weighted factor W1(n) and second weighted factor W2(n) appropriately to reduce error signal $\epsilon$. That is, W1(n) and W2(n) are appropriately varied to reduce the difference between input signal x(n) and estimated input signal $\hat{x}(n)$. As may be seen from inspection of FIG. 2:

$$\hat{x}(n) = W1(n-1)x(n-1) + W2(n-1)x(n-2) \quad [9]$$

Both weighted factors W1(n), W2(n) are adaptive and are preferably determined by a least mean square algorithm, so that:

$$W1(n) = W1(n-1) + \mu\epsilon(n)x(n-1) \quad [10]$$

$$W2(n) = W2(n-1) + \mu\epsilon(n)x(n-2) \quad [11]$$

Thus, from FIG. 2 and Eqn. [9]:

$$\epsilon(n) = x(n) - \hat{x}(n) = x(n) - W1(n-1)x(n-1) - W2(n-1)x(n-2) \quad [12]$$

If the input signal x(n) is a pure sine wave, then, from Eqn. [8], W1(n) would converge to a value W defined by the expression:

$$W = 2\cos\frac{2\pi f(n)}{f_s}$$

and W2 would have a value of −1. However, one realistically should expect to receive a sine wave accompanied by a noise factor. Such a real world situation may be generally expressed by:

$$x(n) = x_s(n) + N(n) \quad [13]$$

$x_s(n)$ = signal term
$N(n)$ = noise term

In the presence of white Gaussian noise, the inventors have found that the first weighted factor W1(n) does not provide an accurate frequency estimation. Thus, second weighted factor W2(n) is employed to estimate noise energy. A correction is then made to first weighted factor W1(n) to obtain an accurate frequency reading.

Further considering Eqn. [10]:

$$W1(n) = W1(n-1) + \mu\epsilon(n)x(n-1) \quad [14a]$$

$\mu$ = gain factor
However, $$W1(n-1) = W1(n-2) + \mu\epsilon(n-1)x(n-2) \quad [14b]$$

Thus, $$W1(n) = W1(n-2) + \mu[\epsilon(n)x(n-1) + \epsilon(n-1)x(n-2)] \quad [14c]$$

Repetitive substitution yields an expansion of Eqn. [14c]:

$$W1(m) = W1(m) + \mu[\epsilon(n)x(n-1) + \epsilon(n-1)x(n-2) + \ldots + \epsilon(m+1)x(m)] \quad [14d]$$

Therefore:

$$W1(n) = W1(m) + \mu \sum_{k=m+1}^{n} \epsilon(k)x(k-1) \quad [15]$$

When the system embodied in the apparatus 100 is in steady state, $\epsilon(n)$ is in the presence of noise, a small signal moving randomly about zero. In such a steady state, the weighting functions W1(n) and W2(n) may be defined as:

$$W1(n) = W1^* + \delta W1(n)$$

$$W2(n) = W2^* + \delta W2(n) \quad [16]$$

Comparing Eqn. [16] with Eqn. [15], and noting a correspondence between the second terms of each of Eqns. [15] and [16], one may note:

If $\mu \to 0$, then $|\delta W1(n)| << 1$ and $|\delta W2(n)| << 1$ \quad [17]

Thus, substituting Eqn. [12] into Eqn. [15] yields:

$$W1(n) = W1(m) + \mu \sum_{k=m+1}^{n} [x(k) - W1(k-1)x(k-1) - \quad [18]$$

$$W2(k-1)x(k-2)]x(k-1)$$

Substituting Eqns. [13] and [16] into Eqn. [18] yields:

$$W1(n) = W1(m) + \mu \sum_{k=m+1}^{n} [\{x_s(k) + N(k)\} - \quad [19]$$

$$\{W1^* + \delta W1(k-1)\}$$

$$\{x_s(k-1) + N(k-1)\} - \{W2^* + \delta W2(k-1)\}$$
$$\{x_s(k-2) + N(k-2)\}][x_s(k-1) + N(k-1)]$$

From Eqn. [8], we know that (recall that $W2^* = -1$, in steady state; the case assumed in connection with Eqn. [8]):

$$x_s(k) - W1^* x_s(k-1) - W2^* x_s(k-2) = 0 \quad [20]$$

Thus, Eqn. [19] reduces to:

$$W1(n) = W1(m) + \mu \sum_{k=m+1}^{n} [N(k) - \delta W1(k-1)x_s(k-1) - \quad [21]$$

$$W1^* N(k-1) - \delta W1(k-1)N(k-1) - $$
$$\delta W2(k-1)x_s(k-2) - W2^* N(k-2) - $$
$$\delta W2(k-1)N(k-2)][x_s(k-1) + N(k-1)]$$

Assuming that noise N(k) is independent of signal $x_s(k)$, as is the case with white Gaussian noise (that is, N(k) is an uncorrelated signal), then:

$$E\{N(k)\} = 0 \text{ (mean of } N(k) = 0\text{)}$$

$$E\{N(k)N(k+n)\} = 0, \text{ when } n = 0 \quad [22]$$

Therefore:

$$\sum_{x=0}^{\infty} x_s(k)N(k) = 0; \text{ and} \quad [23]$$

$$\sum_{x=0}^{\infty} x_s(k-1)N(k) = 0$$

That is, in general:

$$\sum_{k=0}^{\infty} x_s(k+L)N(k) = 0, \text{ for any } L \quad [24]$$

Expanding Eqn. [21] yields:

$$W1(n) = W1(m) + \mu \sum_{k=m+1}^{n} \underline{[N(k)x_s(k-1)} + \quad [25]$$

$$\underline{N(k)N(k-1)} - \delta W1(k-1)x_s^2(k-1) - $$

$$\delta W1(k-1)x_s(k-1)N(k-1) - \underline{W1^* N(k-1)x_s(k-1)} - $$

-continued $$W1N^2(k-1) - \underline{\delta W1(k-1)N(k-1)x_s(k-1)} - \delta W1(k-1)N_2(k-1) - \delta W2(k-1)x_s(k-1)x_2(k-2) -$$

$$\underline{\delta W2(k-1)x_s(k-2)N(k-1)} - \underline{W2^*N(k-2)x_s(k-1)} -$$

$$\underline{W2^*N(k-2)N(k-1)} - \underline{\delta W2(k-1)N(k-2)x_s(k-1)} -$$

$$\underline{\delta W2(k-1)N(k-2)N(k-1)}]$$

By Eqn. [23] and Eqn. [24], we know that all terms underlined in Eqn. 25 equal zero, so:

$$W1(n) = W1(m) + \mu \sum_{k=m+1}^{n} [-\delta W1(k-1)x_s^2(k-1) - \quad [26]$$

$$W1^*N^2(k-1) - \delta W1(k-1)N^2(k-1) -$$

$$\delta W2(k-1)x_2(k-1)x_s(k-2)] \quad 25$$

Recall that when $|\mu|<<1$, $|\delta W1(k)|<<1$ and $|\delta W2(k)|<<1$, so $$W1(n) \approx W1(m) + \mu \sum_{k=m+1}^{n} [-W1^*N^2(k-1)] \quad [27]$$

Therefore, $$W1(n) \approx W1(m) - \mu W1^* R_N(0) \quad [28]$$

where $$R_N(n) = \sum_{k=0}^{\infty} N(k+n)N(k)$$

Observing that $W1(n) \cong W1^*$ when $n \to \infty$, Eqn. [28] may be expressed:

$$W1^* \approx W1(m) - \mu W1^* Rn(0) \quad [29]$$

Applying a similar derivation to Eqn. [11] yields:

$$W2^* \approx W2(m) + \mu Rn(0) \quad [30]$$

$$\mu Rn(0) = W2^* - W2(m) \quad [b\ 31]$$

Substituting Eqn. [31] in Eqn. [29] yields;

$$W1^* \approx W1(m) - W1^*[W2^* - W2(m)] \quad [32]$$

$$W1^* = W1(m) - 2\cos\frac{2\pi f_0}{f_s}[W2^* - W2(m)] \quad [33]$$

$$W1^* = W1(m) + 2\cos\frac{2\pi f_0}{f_s}[1 + W2(m)] \quad [33]$$

Given the cosine function, generally, one can make the following approximations:

$$\cos\frac{2\pi f_0}{f_s} = \begin{cases} -\frac{1}{2} & 1 < \frac{f_s}{f_0} < 3.6 \\ 0 & 3.6 < \frac{f_s}{f_0} < 4.4 \\ +\frac{1}{2} & 4.4 < \frac{f_s}{f_0} < \infty \end{cases} \quad [35]$$

Substituting Eqn. [35] in eqn. [34] yields:

$$W1^* = \begin{cases} W1(m) - [1 + W2(m)] & 2 < \frac{f_s}{f_0} < 3.6 \\ W1(m) & 3.6 < \frac{f_s}{f_0} < 4.4 \\ W1(m) + [1 + W2(m)] & 4.4 < \frac{f_s}{f_0} < \infty \end{cases} \quad [36]$$

As previously mentioned, the quantity $$\frac{f_s}{f_0}$$

Ps must be greater than two to satisfy the requirements of Nyquist sampling theory. Thus, if $$W1(m) \approx 2\cos\frac{2\pi f_0}{f_s}$$

then Eqn. [36] may be represented as:

$$W1^* = \begin{cases} W1(m) - [1 + W2(m)] & -2 < W1(m) < -0.35 \\ W1(m) & -0.35 < W1(m) < 0.28 \\ W1(m) + [1 + W2(m)] & 0.28 < W1(m) < 2 \end{cases} \quad [37]$$

Thus, given the theoretical background provided by Eqns. [8] through [37], the operation of apparatus 100 illustrated in FIG. 2 may be further explained in that apparatus 100 includes a frequency identification circuit 150. Frequency identification circuit 150 comprises a summing node 152 which receives second weighted factor W2 from second weighted factor source 134 at an input 154. Summing node 152 also receives at a second input 156 the steady state value of W2* (=−1). Since input 156 is an inverting input, summing node 152 produces at its output 158 a signal representing the quantity [1+W2(n)], which signal is received at an input 162 of a multiplier 160.

The quantity W1(n) is applied to an input 164 of a threshold circuit 166. Threshold circuit 166 is preferably designed to substantially implement the approximations represented by Eqn. [37] above, so that the signal, "A", provided by threshold circuit 166 at its output 168 is variable, as indicated in the table associated with FIG. 2, according to the value of signal W1(n) received at input 164. The output signal provided by threshold circuit 166 is applied to an input 170 of multiplier 160 so that multiplier 160 provides at its output 172 a signal "B". Signal "B" varies as indicated in the table associated with FIG. 2, depending upon the value of W1(n) received at input 164 of threshold circuit 166. Signal "B" is applied to an input 174 of a summing node 176; the signal W1(n) is provided to a second input 178 of summing node 176 from first weighted factor source 118, and summing node 176 provides at its output 180 the value W1*. Thus signal W1* is calculated by frequency identification circuit 150 in accordance with Eqn. [37] above.

The value provided at output 180 of summing node 176 uniquely identifies the frequency of the sinusoidal signal, $x_s(n)$, received at input 106 of delay circuit 102 through a look-up table or similar arrangement in a logic circuit (not shown in FIG. 2). In such manner, a second weighted factor, W2(n), is employed to estimate noise energy in the received signal x(n) and second weighted factor W2(n) is employed to apply a correction to first weighted factor W1(n) in order to accurately reflect an index uniquely identifying the sinusoidal wave form $x_s(n)$ contained within the received signal $x_n$, which is received in the form of Eqn. [13], i.e., $$x_n = x_s(n) + N(n) \quad [13]$$

It is to be understood that, while the detailed drawings and specific example given describe a preferred embodiment of the invention, they are for the purpose of illustration only, that the apparatus of the invention is not limited to the precise details and conditions disclosed and that various changes may be made therein without departing from the spirit of the invention which is defined by the following claims.

We claim:

1. An apparatus for adaptively tuning to a received periodic signal; the apparatus comprising:

an oscillator means for generating a sinusoidal estimated output signal, said estimated output signal being algorithmically derived from said received signal, said algorithmic derivation involving a plurality of factors; said algorithmic derivation occurring according to the following relationship:

$$est.x_{n+1} = Kx_n - x_{n-1}$$

where: est. $x_{n+1}$ = said estimated output signal
$x_{n+1} = \cos((n+1) + \Delta)$
$x_n = \cos((n)\Delta)$
$x_{n-1} = \cos((n-1)\Delta$
K = a constant representing
K = 2 cos Δ
where $$\Delta = \frac{2\pi f}{f_s}$$

f = an estimate of frequency of said received signal
$f_s$ = sampling frequency of the apparatus; and
a difference determining means for determining a difference between two signals, said difference determining means comparing said received signal with said estimated output signal and generating at least one error signal representative of said difference between said estimated output signal and said received signal;
said at least one error signal being operatively supplied to said oscillator means appropriately to affect at least one factor of said plurality of factors to alter said estimated output signal to reduce said difference.

2. An apparatus for adaptively tuning to a received periodic signal; the apparatus comprising:
an oscillator means for generating a sinusoidal estimated output signal, said estimated output signal being algorithmically derived from said received signal, said algorithmic derivation involving a plurality of factors; and
a difference determining means for determining a difference between two signals, said difference determining means comparing said received signal with said estimated output signal and generating at least one error signal representative of said difference between said estimated output signal and said received signal;
said at least one error signal being operatively supplied to said oscillator means appropriately to affect at least one factor of said plurality of factors to alter said estimated output signal to reduce said difference;
said algorithmic derivation comprising establishing said estimated output signal as said received signal delayed one clock period multiplied by a constant, less said received signal delayed two said clock periods; said constant being expressed as
K = 2 cos Δ, where $$\Delta = \frac{2\pi f}{f_s}$$

f = an estimate of frequency of said received signal
$f_s$ = sampling frequency of the apparatus.

3. A digital signal processing apparatus for adaptively tuning to a received sinusoidal signal; the apparatus comprising:
an oscillator means for generating a sinusoidal estimated output signal, said estimated output signal being algorithmically derived from said received signal, said algorithmic derivation involving a plurality of factors; said algorithmic derivation occurring according to the following relationship:

$$est.x_{n+1} = Kx_n - x_{n-1}$$

where est.$x_{n+1}$ = said estimated output signal
$x_{n+1} = \cos((n+1) + \Delta)$
$x_n = \cos((n)\Delta)$
$x_{n-1} = \cos ))n-1)\Delta)$
K = a constant representing
K = 2 cos Δ
where $$\Delta = \frac{2\pi f}{f_s}$$

f = an estimate of frequency of said received signal
$f_s$32 sampling frequency of the apparatus; and
a difference determining means for determining a difference between two signals, said difference determining means comparing said received signal with said estimated output signal and generating at least one error signal representative of said difference between said estimated output signal and said received signal;
said at least one error signal being operatively supplied to said oscillator means appropriately to affect at least one factor of said plurality of factors to alter said estimated output signal to reduce said difference.

4. A digital signal processing apparatus for adaptively tuning to a received sinusoidal signal; the apparatus comprising:

an oscillator means for generating a sinusoidal estimated output signal, said estimated output signal being algorithmically derived from said received signal, said algorithmic derivation involving a plurality of factors; and a difference determining means for determining a difference between two signals, said difference determining means comparing said received signal with said estimated output signal and generating at least one error signal representative of said difference between said estimated output signal and said received signal;

said at least one error signal being operatively supplied to said oscillator means appropriately to affect at least one factor of said plurality of factors to alter said estimated output signal to reduce said difference;

said algorithmic derivation comprising establishing said estimated output signal as said received signal delayed one clock period multiplied by a constant, less said received signal delayed two said clock periods; said constant being expressed as K = 2 cos Δ, where $$\Delta = \frac{2\pi f}{f_s}$$

f = an estimate of frequency of said received signal
$f_s$ = sampling frequency of the apparatus.

5. A digital signal processing apparatus for adaptively tuning to a received periodic signal; the apparatus comprising:

a first delay circuit, said first delay circuit receiving said received signal and generating a once-delayed signal, said once-delayed signal being substantially said received signal delayed one clock period;

a second delay circuit, said second delay circuit receiving said once-delayed signal from said first delay circuit and generating a twice-delayed signal, said twice-delayed signal being substantially said received signal delayed two said clock periods;

a multiplying circuit, said multiplying circuit receiving said once-delayed signal from said first delay circuit and receiving a multiplier from a multiplier source, said multiplying circuit generating a multiplier output signal, said multiplier output signal being substantially said once-delayed signal multiplied by said multiplier, said multiplier being expressed as K = 2 cos Δ, where $$\Delta = \frac{2\pi f}{f_s}$$

f = an estimate of frequency of said received signal
$f_s$ = sampling frequency of the apparatus;

a first summing circuit, said first summing circuit receiving said multiplier output signal and receiving said twice-delayed signal, said first summing circuit generating an estimated output signal, said estimated output signal being substantially the sum of said multiplier output signal and said twice-delayed signal; and a second summing circuit, said second summing circuit receiving said received signal and receiving said estimated output signal, said second summing circuit generating an error signal, said error signal being representative of the difference between said received signal and said estimated output signal; said error signal being operatively supplied to said multiplier source, said multiplier source being responsive to said error signal to alter said multiplier appropriately to change said multiplier output signal to reduce said difference between said received signal and said estimated output signal.

6. A digital signal processing apparatus for adaptively tuning to a received periodic signal as recited in claim 5 wherein the apparatus further comprises frequency identification means for identifying the frequency of said received signal; said frequency identification means receiving said multiplier from said multiplier source, said frequency identification means uniquely identifying said frequency of said received signal by said multiplier when said error signal is substantially zero.

7. An apparatus for adaptively tuning to a received periodic signal, said received signal being a component of an input signal, said input signal including at least some white Gaussian noise; the apparatus comprising:

an oscillator means for generating a sinusoidal estimated output signal, said estimated output signal being algorithmically derived from said input signal, said algorithmic derivation involving at least one adaptive weight factor for generating said estimated output signal, said at least one adaptive weight factor being in the form $$W = 2\cos\frac{2\pi f(n)}{f_s}$$

where
W = said at least one adaptive weight factor
f(n) = time varying frequency of said received signal
$f_s$ = sampling frequency of the apparatus; and a difference determining means for determining a difference between two signals, said difference determining means comparing said input signal with said estimated output signal and generating at least one error signal representative of said difference between said estimated output signal and said input signal;

said at least one error signal being operatively supplied to said oscillator means appropriately to affect at least one of said at least one adaptive weight factor to alter said estimated output signal to reduce said difference.

8. An apparatus for adaptively tuning to a received periodic signal as recited in claim 7 wherein said algorithmic derivation comprises establishing said estimate output signal as said input signal delayed one clock period multiplied by a first weighted factor of said at least one weighted factor, less said input signal delayed two said clock periods.

9. An apparatus for adaptively tuning to a received periodic signal as recited in claim 7 wherein said algorithmic derivation comprises establishing said estimate output signal as said input signal delayed one clock period multiplied by a first weighted factor of said at least one weighted factor, less said input signal delayed two said clock periods multiplied by a second weighted factor of said at least one weighted factor.

10. An apparatus for adaptively tuning to a received sinusoidal signal, said received signal being a component of an input signal, said input signal including at least some white Gaussian noise; the apparatus comprising:

an oscillator means for generating a sinusoidal estimated output signal, said estimated output signal being algorithmically derived from said input signal, said algorithmic derivation involving at least one adaptive weight factor for generating said estimated output signal, said at least one adaptive weight factor being in the form $$W = 2\cos\frac{2\pi f(n)}{f_s}$$

where

W = said at least one adaptive weight factor
f(n) = time varying frequency of said received signal
$f_s$ = sampling frequency of the apparatus; and
a difference determining means for determining a difference between two signals, said difference determining means comparing said input signal with said estimated output signal and generating at least one error signal representative of said difference between said estimated output signal and said input signal;
said at least one error signal being operatively supplied to said oscillator means appropriately to affect at least one of said at least one adaptive weight factor to alter said estimated output signal to reduce said difference.

11. An apparatus for adaptively tuning to a received sinusoidal signal as recited in claim 10 wherein said algorithmic derivation comprises establishing said estimate output signal as said input signal delayed one clock period multiplied by a first weighted factor of said at least one weighted factor, less said input signal delayed two said clock periods.

12. An apparatus for adaptively tuning to a received sinusoidal signal as recited in claim 10 wherein said algorithmic derivation comprises establishing said estimate output signal as said input signal delayed one clock period multiplied by a first weighted factor of said at least one weighted factor, less said input signal delayed two said clock periods multiplied by a second weighted factor of said at least one weighted factor.

13. A digital signal processing apparatus for adaptively tuning to a received periodic signal, said received signal being a component of an input signal, said input signal including at least some what Gaussian noise; the apparatus comprising:
a first delay circuit, said first delay circuit receiving said input signal and generating a once-delayed signal, said once-delayed signal being substantially said input signal delayed one clock period;
a second delay circuit, said second delay circuit receiving said once-delayed signal from said first delay circuit and generating a twice-delayed signal, said twice-delayed signal being substantially said input signal delayed two said clock periods;
a first multiplying circuit, said first multiplying circuit receiving said once-delayed signal from said first delay circuit and receiving a first weight factor from a first weight factor source, said first multiplying circuit generating a weighted once-delayed output signal, said weighted once-delayed output signal being substantially said once-delayed signal multiplied by said first weight factor;
a second multiplying circuit, said second multiplying circuit receiving said twice-delayed signal from said second delay circuit and receiving a second weight factor from a second weight factor source, said second multiplying circuit generating a weighted twice-delayed output signal, said weighted twice-delayed output signal being substantially said twice-delayed signal multiplied by said second weight factor;
a first summing circuit, said first summing circuit receiving said weighted once-delayed output signal and receiving said weighted twice-delayed signal, said first summing circuit generating an estimated output signal, said estimated output signal being substantially the sum of said weighted once-delayed output signal and said weighted twice-delayed signal; and
a second summing circuit, said second summing circuit receiving said input signal and receiving said estimated output signal, said second summing circuit generating an error signal, said error signal being representative of the difference between said input signal and said estimated output signal;
said error signal being operatively supplied to said first weight factor source and to said second weight factor source, said first weight factor source and said second weight factor source being responsive to said error signal to alter said first weight factor and said second weight factor appropriately to change said weighted once-delayed output signal and said weighted twice-delayed output signal to reduce said difference between said input signal and said estimated output signal.

14. A digital signal processing apparatus for adaptively tuning to a received periodic signal as recited in claim 13 wherein the apparatus further comprises frequency identification means for identifying the frequency of said received signal; said frequency identification means receiving said first weight factor from said first weight factor source as a first input, and receiving said second weight factor from said second weight factor source as a second input, said frequency identification means algorithmically calculating a frequency index from said first input and said second input, said frequency index uniquely identifying said frequency of said received signal.

15. A digital signal processing apparatus for adaptively tuning to a received sinusoidal signal, said received signal being a component of an input signal, said input signal including at least some white Gaussian noise; the apparatus comprising:
a first delay circuit, said first delay circuit receiving said input signal and generating a once-delayed signal, said once-delayed signal being substantially said input signal delayed one clock period;
a second delay circuit, said second delay circuit receiving said once-delayed signal from said first delay circuit and generating a twice-delayed signal, said twice-delayed signal being substantially said input signal delayed two said clock periods;
a first multiplying circuit, said first multiplying circuit receiving said once-delayed signal from said first delay circuit and receiving a first weight factor from a first weight factor source, said first multiplying circuit generating a weighted once-delayed output signal, said weighted once-delayed output signal being substantially said once-delayed signal multiplied by said first weight fact;
a second multiplying circuit, said second multiplying circuit receiving said twice-delayed signal from said second delay circuit and receiving a second weight factor from a second weight factor source, said second multiplying circuit generating a weighted twice-delayed output signal, said weighted twice-delayed output signal being substantially said twice-delayed signal multiplied by said second weight factor;

a first summing circuit, said first summing circuit receiving said weighted once-delayed output signal and receiving said weighted twice-delayed signal, said first summing circuit generating an estimated output signal, said estimated output signal being substantially the difference between said weighted once-delayed output signal less said weighted twice-delayed signal; and a second summing circuit, said second summing circuit receiving said input signal and receiving said estimated output signal, said second summing circuit generating an error signal, said error signal being representative of the sum of said input signal and said estimated output signal;

said error signal being operatively supplied to said first weight factor source and to said second weight factor source, said first weight factor source and said second weight factor source being responsive to said error signal to alter said first weight factor and said second weight factor appropriately to change said weighted once-delayed output signal and said weighted twice-delayed output signal to reduce said difference between said input signal and said estimated output signal.

16. A digital signal processing apparatus for adaptively tuning to a received sinusoidal signal as recited in claim 15 wherein the apparatus further comprises frequency identification means for identifying the frequency of said received signal; said frequency identification means receiving said first weight factor from said first weight factor source as a first input, and receiving said second weight factor from said second weight factor source as a second input, said frequency identification means algorithmically calculating a frequency index from said first input and said second input, said frequency index uniquely identifying said frequency of said received signal.

* * * * *